United States Patent
Dabral et al.

(10) Patent No.: US 9,766,692 B2
(45) Date of Patent: Sep. 19, 2017

(54) PHYSICAL LAYER FOR PERIPHERAL INTERCONNECT WITH REDUCED POWER AND AREA

(71) Applicant: Apple Inc., Cupertino, CA (US)

(72) Inventors: Sanjay Dabral, Cupertino, CA (US); R. Stephen Polzin, San Jose, CA (US)

(73) Assignee: Apple Inc., Cupertino, CA (US)

( * ) Notice: Subject to any disclaimer, the term of this patent is extended or adjusted under 35 U.S.C. 154(b) by 296 days.

(21) Appl. No.: 14/729,335

(22) Filed: Jun. 3, 2015

(65) Prior Publication Data

US 2016/0034025 A1  Feb. 4, 2016

Related U.S. Application Data

(60) Provisional application No. 62/032,407, filed on Aug. 1, 2014.

(51) Int. Cl.
*G06F 1/32* (2006.01)
*G06F 13/42* (2006.01)

(52) U.S. Cl.
CPC .......... *G06F 1/3296* (2013.01); *G06F 1/3253* (2013.01); *G06F 1/3287* (2013.01); *G06F 13/4221* (2013.01); *G06F 13/4282* (2013.01); *G06F 2213/0024* (2013.01); *Y02B 60/1235* (2013.01); *Y02B 60/1282* (2013.01); *Y02B 60/1285* (2013.01); *Y02B 60/32* (2013.01)

(58) Field of Classification Search
CPC ................. G06F 1/3253; G06F 1/3287; G06F 2213/0024; G06F 2213/0026
See application file for complete search history.

(56) References Cited

U.S. PATENT DOCUMENTS

| | | | | |
|---|---|---|---|---|
| 6,886,057 B2* | 4/2005 | Brewer | ................. | G06F 13/385 710/11 |
| 7,152,136 B1* | 12/2006 | Charagulla | ........... | G06F 13/385 370/469 |
| 7,257,655 B1* | 8/2007 | Burney | ................. | G06F 13/423 370/408 |
| 7,353,443 B2* | 4/2008 | Sharma | ............... | G06F 11/0745 714/712 |
| 7,613,959 B2* | 11/2009 | Tseng | ................ | H04L 25/03866 358/426.09 |

(Continued)

OTHER PUBLICATIONS

LeCroy—"Active State Power Management"; 8 pages, Dated Oct. 22, 2009.*

(Continued)

*Primary Examiner* — Brian Misiura
(74) *Attorney, Agent, or Firm* — Meyertons, Hood, Kivlin, Kowert & Goetzel, P.C.; Lawrence J. Merkel

(57) ABSTRACT

An integrated circuit (IC) implements an industry standard-defined peripheral interconnect to connect to another integrated circuit or component in a system. The industry standard specification includes a software interface that is well-defined and implemented by various software in the system, and thus is desirable to retain. However, the physical interconnect in the systems employing the integrated circuit may be short, and thus the elaborate physical layer definition may consume more integrated circuit area and power than is otherwise desirable in the IC. The IC may implement a simpler and more power-efficient physical layer, reducing both power consumption and semiconductor substrate area consumption, in some embodiments.

20 Claims, 4 Drawing Sheets

(56) References Cited

U.S. PATENT DOCUMENTS

| | | | | |
|---|---|---|---|---|
| 8,805,196 | B2* | 8/2014 | Kasprzyk | H04B 10/40 398/140 |
| 9,264,368 | B2* | 2/2016 | Swarbrick | H04L 25/02 |
| 9,535,875 | B2* | 1/2017 | Wilson | G06F 15/17362 |
| 9,563,260 | B2* | 2/2017 | Wagh | H04W 52/0203 |
| 2012/0017016 | A1 | 1/2012 | Ma et al. | |
| 2012/0110217 | A1 | 5/2012 | Christiansen et al. | |
| 2012/0191887 | A1* | 7/2012 | Yamauchi | G06F 13/4282 710/106 |
| 2012/0246505 | A1 | 9/2012 | Ma et al. | |
| 2013/0336334 | A1 | 12/2013 | Gilbert et al. | |

OTHER PUBLICATIONS

Mansuri et al., A Scalable 0.128-1 Tb/s, 0.8-2.6 pJ/bit, 64-Lane Parallel I/O in 32-nm CMOS, IEEE Journal of Solid-State Circuits, vol. 48, No. 12, Dec. 2013, pp. 3229-3242.

Liu, et al., A 0.1pJ/b 5-to-10Gb/s Charge-Recyclying Stacked Low-Power I/O for On-Chip Signaling in 45nm CMOS SOI, IEEE International Solid-State Circuits Conference, Digest of Technical Papers, 2013, 978-1-4673-4516-3/13, pp. 400-402.

Mansuri et al., A Scalable 0.128-1 Tb/s, 0.8-2.6 pJ/bit, 64-Lane Parallel I/O in 32-nm CMOS, IEEE Journal of Solid-State Circuits Conference, Digest of Technical Papers, 2013, 978-1-4673-4516-3/13, pp. 402-404.

Poulton et al., A 0.54pJ/b 20Gb/s Ground-Referenced Single-Ended Short-Haul Serial Link in 28nm CMOS for Advanced Packaging Applications, Digest of Technical Papers, 2013, 978-1-4673-4516-3/13, pp. 404-406.

Yeung et al., Power/Performance/Channel Lenght Tradeoffs in 1.6 to 9.6Gbps I/O Links in 90nm CMOS for Server, Desktop, and Mobile Applications, IEEE 2006 Symposium on VLSI Circuits Digest of Technical Papers, 1-4244-0006-6/06, pp. 2.

* cited by examiner

| Circuit | Function | Replacement | Reason |
|---|---|---|---|
| Rx Detect | Tx detects far end Rx presence | Send detect to controller without testing | Rx presence is known |
| Electrical Idle Detect | Rx detect valid signal or electrical idle presence | Use logic layer to detect or simplify in Rx | Relative clean, large signal available |
| ESD Protection | Protect circuitry from ESD/latchup | Smaller ESD devices, lower area and load | Less protection needed |
| High Speed Receiver | Receive signals | Minimize equalization, simplify timing recovery | Lower Loss Channels |
| High Speed Transmitter | Transmit signals | Minimize equalization, lower signal swings | Lower Loss Channels |
| Clock/Data Recovery | Recover sample clock from input stream | Use strobe or forwarded clock | simplification |

Fig. 7

PHYSICAL LAYER FOR PERIPHERAL INTERCONNECT WITH REDUCED POWER AND AREA

This application claims benefit of priority to U.S. Provisional Patent Application Ser. No. 62/032,407, filed on Aug. 1, 2014, which is incorporated herein by reference in its entirety. To the extent that the incorporated material conflicts with the material expressly set forth there, the expressly set forth material controls.

BACKGROUND

Technical Field

Embodiments described herein are related to physical layer circuits for peripheral interconnects.

Description of the Related Art

Various peripheral interconnects exist to provide communication between components in an electrical system such as a computer, a portable electronic device, an embedded system, etc. Exemplary peripheral interconnects include Universal Serial Bus (USB), Peripheral Component Interconnect (PCI), PCI Express (PCIe), etc. Typically, the peripheral interconnect is specified by a standard agreed to by component designers and manufacturers. The standard defines the protocol of the interconnect, its software interface, its electrical properties (such as voltage, current, clock frequency, etc.), physical dimensions of connectors for the interconnect, etc. Generally, the standard is defined so that a wide range of implementations can be made, including a variety of lengths for the conductors that form the connection. Accordingly, a relatively complex, large, and power-consuming physical layer is included to drive and receive signals over long lengths, including noise management, reflection management, etc.

SUMMARY

An integrated circuit (IC) implements an industry standard-defined peripheral interconnect to connect to another integrated circuit or component in a system. The industry standard specification includes a software interface that is well-defined and implemented by various software in the system, and thus is desirable to retain. However, the physical interconnect in the systems employing the integrated circuit may be short, and thus the elaborate physical layer definition may consume more integrated circuit area and power than is otherwise desirable in the IC. The IC may implement a simpler and more power-efficient physical layer, reducing both power consumption and semiconductor substrate area consumption, in some embodiments.

BRIEF DESCRIPTION OF THE DRAWINGS

The following detailed description makes reference to the accompanying drawings, which are now briefly described.

FIG. 7 is a table illustrating changes to the PHYs for one embodiment.

Figure 1:
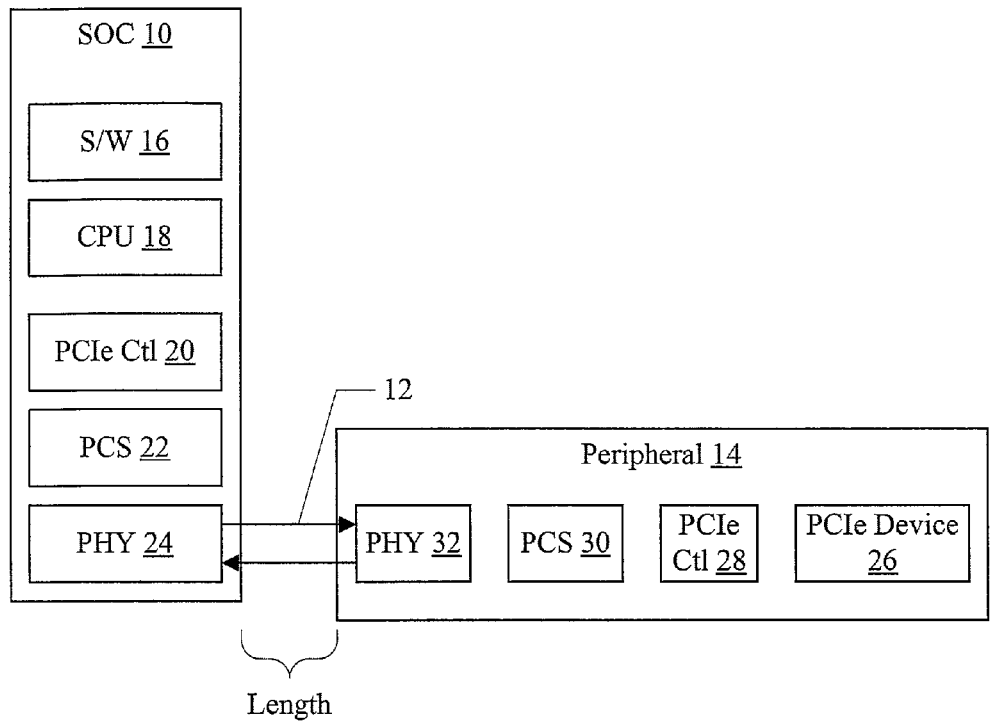
FIG. 1 is a block diagram of one embodiment of an integrated circuit and a peripheral device.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits to implement the operation. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

In the description below, the PCIe interface is used as an example. However, other embodiments may implement other interfaces defined by other industry standard specifications. Generally, an industry standard specification may be a specification that is agreed upon by a group with representatives from multiple companies, and that may be licensed and implemented by any company. The existence of an industry standard specification and compliance with such a standard may be of benefit to many companies attempting to make a product for a given technology space in which the industry standard is prevalent (e.g. mobile devices, computers, etc.). The PCIe standard specification for the physical layer (PHY) and the physical coding sublayer (PCS) is designed to manage communication over potentially long, noisy distances. Thus, the PCIe standard specifies terminated drivers and receivers, differential signaling, significant external resources such as clean (non noisy) power supplies and clock sources, AC capacitors on the interconnect, 8b/10b encoding with embedded clock, etc. If the interconnect length to which an IC is to be connected is short and well managed (e.g. in embedded systems with well defined interconnect), these features may be more than is necessary for dependable, consistent communication on the interface. In one embodiment, one or both of the PHY and PCS may be simplified while maintaining software compatibility with the standard. Accordingly, software may maintain its interface model while the size and power consumption of the lower layers may be reduced. The PHY and/or PCS layers may not comply strictly with the industry standard interface, but may be used in well controlled systems in which all communicators on the interface implement the same PHY and/or PCS.

FIG. 1 is a block diagram of one embodiment of a system including an IC 10 (more particularly a system on a chip (SOC) 10 in the illustrated embodiment) coupled to a PCIe interconnect 12 to communicate with a peripheral 14. The SOC 10 may include software 16. The software 16 may be loaded into the SOC 10 or a memory coupled thereto, not shown in FIG. 1 and/or which may be stored on a non-volatile memory in the SOC 10 or coupled thereto. The SOC 10 may further include one or more processors forming a central processing unit (CPU) 18, a PCIe controller 20, a PCS 22, and a PHY 24. The peripheral 14 may include a PCIe device 26, a PCIe controller 28, a PCS 30, and a PHY 32. The PCIe interconnect 12 may have a short length compared to the supported length for the standard. For example, about 1-2 inches may be the length, in an embodiment, although longer and shorter lengths may be used.

As illustrated in FIG. 1, the PCIe interconnect 12 may be a link including unidirectional point-to-point transmission. Thus, each partner on a link may include both transmit circuitry and receive circuitry.

The PHYs 24 and 32 may implement the PHY layer of the interface, which may include a physical media attachment (PMA) layer in some embodiments. The PCSs 22 and 30 may implement the physical coding sublayer of the interface, and the PCIe controllers 20 and 28 may implement the media access control (MAC) layer of the interface. Thus, the access model for software 16 (executed by the CPU 18) may be retained by retaining the PCIe controllers 20 and 28 while changing the PHYs 24 and 32 and optionally changing the PCSs 22 and 30.

Figure 2:
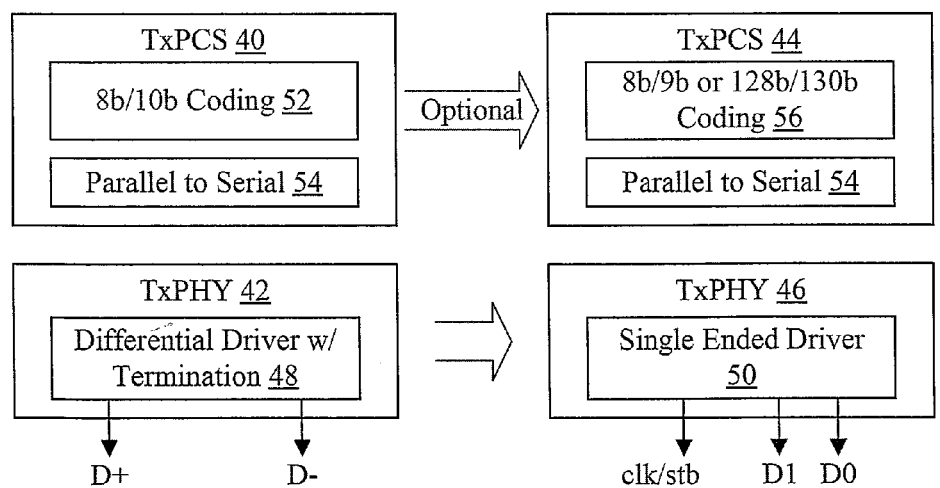
FIG. 2 is a block diagram of one embodiment of a physical coding sublayer (PCS) and a physical layer (PHY) on a transmit side according to a standard, and one embodiment of a replacement PCS and PHY layer.

For example, FIG. 2 illustrates an exemplary transmit side (Tx) PCS and PHY (TxPCS 40 and TxPHY 42) according to the PCIe specification and a simplified TxPCS 44 and TxPHY 46 that may be used in place of the TxPCS 40 and TxPHY 42, respectively, in an embodiment. At least the TxPHY 46 may be used in place of the TxPHY 42, and optionally the TxPCS 44 may be used in place of the TxPCS 40 as well. That is, the PHYs 24 and 32 may each include the TxPHY 46, and the PCSs 22 and 30 may optionally each include the TxPCS 44.

Figure 3:
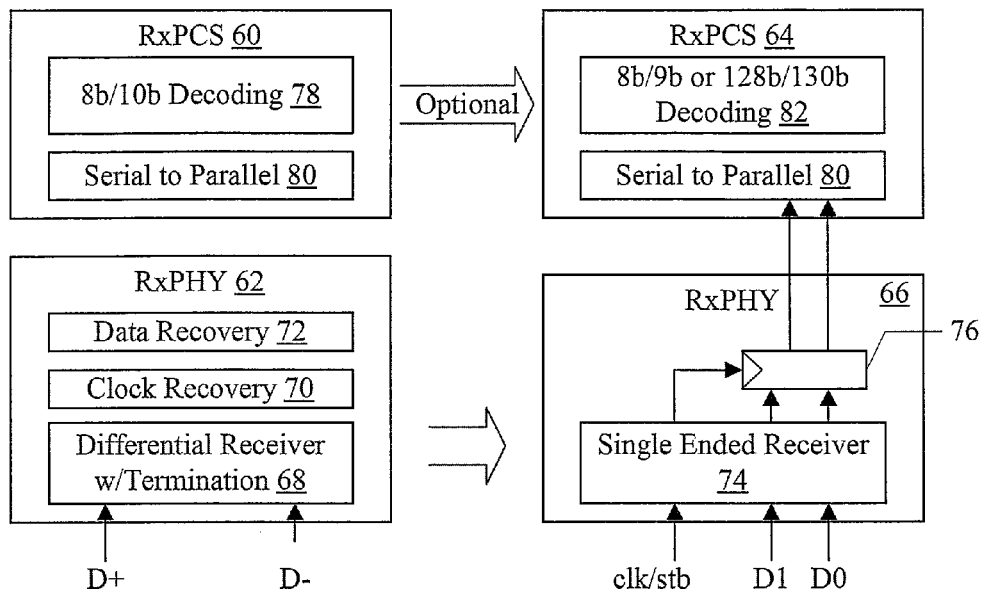
FIG. 3 is a block diagram of one embodiment of a physical coding sublayer (PCS) and a physical layer (PHY) on a receive side according to a standard, and one embodiment of a replacement PCS and PHY layer.

As illustrated in FIG. 2, the PCIe standard TxPHY 42 may include differential driver circuitry 48 with termination circuitry. As illustrated in FIG. 3 below, the corresponding RxPHY may include termination circuitry as well, and both sets of termination circuitry consume power. The termination circuitry may be provided to manage reflections. However, reflections may be better controlled for the shorter interface lengths such as those that may be implemented in the embodiment of FIG. 1. To reduce power, termination circuitry may be simplified in the TxPHY 46 (and in the RxPHY described below) or the impedance may be increased.

Differential signaling may improve noise rejection characteristics and signal strength. Signal strength may not be an issue for shorter interface lengths. Noise may also be lessened due to less interaction of electro-magnetic volumes (and thus smaller inductance). Reduced noise may result from no sockets/connectors or a minimum number of sockets/connectors on the interface, as well as fine pitch chip to substrate (package and/or board) attachment. The TxPHY 42 may also support multiple tap equalizers, which consume power as well. The TxPHY 46 may replace the differential driver circuitry 48 with source terminated single-ended driver circuitry 50. Power consumption may be reduced in the driver circuitry 50 as compared to the driver circuitry 48, since one signal per bit may be transitioning as opposed to two signals per bit. In an embodiment, a singled ended clock signal may be used in a clock-forwarded implementation of the single ended interface. In another embodiment, additional power savings may be realized by using a strobe signal to indicate data transmission. With a clock, data may be transmitted each clock cycle (or clock edge). With a strobe, if there are periods of idle (no transmission), the strobe may be held steady to avoid transitions and thus reducing power consumption. In another embodiment, unterminated differential driver circuitry may be used. In still another embodiment, terminated single-ended circuitry may be used. In some embodiments, a lower supply voltage may be used than is specified in the PCIe standard, further reducing power consumption.

In addition, for small interconnect, placing external capacitors is challenging because of area limitations. For such links, the equivalent capacitors may be moved on-chip, however even these capacitors consume area, and may have increased baseline wander. A DC-coupled link may be used in some embodiments to eliminate the capacitors.

As mentioned previously, in some embodiments, the PCIe standard TxPCS 40 may be retained with the simplified TxPHY 46. In other embodiments, the PCIe standard TxPCS 40 may be replaced with a simplified TxPCS 44. As illustrated in FIG. 2, the PCIe standard TxPCS 40 may include 8b/10b coding. There may be an 8b/10b coding circuit 52, as well as a parallel to serial converter circuit 54 to convert the 10 bit symbols to a serial stream at the bit rate clock frequency. Optionally, the TxPCS 40 may further include input buffering to receive input data from the PCIe controller 20 that is wider than 8 bits, if applicable (input buffering not shown in FIG. 2). The simplified TxPCS 44 may include 8b/9b or even 128b/130b coding circuitry 56, reducing the number of transmitted bits per actual data bit and thus reducing power consumed to transmit the data. The parallel to serial converter circuit 54 may be included in the TxPCS 44 as well. In some embodiments, coding may be eliminated completely and the data may simply be transmitted.

FIG. 3 illustrates an exemplary receive side (Rx) PCS and PHY (RxPCS 60 and RxPHY 62) according to the PCIe specification and a simplified RxPCS 64 and RxPHY 66 that may be used in place of the RxPCS 60 and RxPHY 62, respectively, in an embodiment. At least the RxPHY 64 may be used in place of the RxPHY 62, and optionally the RxPCS 64 may be used in place of the RxPCS 60 as well. That is, the PHYs 24 and 32 may each include the RxPHY 66, and the PCSs 22 and 30 may optionally each include the RxPCS 64.

As illustrated in FIG. 3, the PCIe standard RxPHY 62 may include differential receiver circuitry 68 with termination circuitry, as well as clock recovery circuitry 70 and data recovery circuitry 72. A standard receiver may include continuous time linear equalizer (CTLE), decision feedback equalizer (DFE), and an equalization adaptation engine including error detection receivers. These circuits add area and clock load. The clock recovery circuitry 70 may be configured to reconstruct the clock that is embedded in the symbol stream from the PCIe interconnect, and the recovered clock may be used to recover the data. The RxPHY 66 may replace the differential receiver circuitry with termination 68 with unterminated single-ended receiver circuitry 74. Other embodiments may implement terminated single-ended receiver circuitry 74 or unterminated differential signaling. The selected embodiment may match the embodiment of the driver circuitry on the interface to which the receiver circuitry 74 is coupled. Additionally, the RxPHY 66 may replace the clock recovery circuitry 70 and the data recovery circuitry 72 with a flop 76, clocked from the forwarded clock or strobe transmitted on the PCIe interface. Power consumption may be reduced in the receiver circuitry 74 as compared to the receiver circuitry 68, since one signal per bit may be transitioning as opposed to two signals per bit. Additionally, differential discrimination circuitry may be replaced by simpler buffer receiver circuitry, in an embodiment. Other embodiments may use other replacement circuitry. For example, lower swing differential signaling or single-ended signaling may be used.

As mentioned previously, in some embodiments, the PCIe standard RxPCS 60 may be retained with the simplified RxPHY 66. In other embodiments, the PCIe standard RxPCS 60 may be replaced with a simplified RxPCS 64. The embodiment of the simplified RxPCS 64 may match the embodiment of the TxPCS 44, as described above with regard to FIG. 2. As illustrated in FIG. 3, the PCIe standard RxPCS 60 may include 8b/10b decoding. There may be an 8b/10b decoding circuit 78, as well as a parallel to serial converter circuit 80 to convert the received serial stream to 10 bit symbols. Optionally, the RxPCS 40 may further include output buffering to collect received data from the interface to wider data output to the PCIe controller 20, if applicable (output buffering not shown in FIG. 3). Additional circuitry such as elastic buffering, K28.5 detection, error handing, etc. may be included as well (not shown in FIG. 3). The simplified RxPCS 64 may include 8b/9b or even 128b/130b decoding circuitry 82, consistent with the encoding included in the TxPCS 44. The parallel to serial converter circuit 80 may be included in the RxPCS 64 as well. In some embodiments, coding may be eliminated completely and the data may simply be received. Other coding possibilities may avoid DC balance requirements, and thus may avoid 8b/10b coding or 128b/130b coding. If single-ended signaling is used and simultaneous switching output noise is an issue, low weight coding options such as dynamic bus inversion may be considered. In some embodiments, the RxPCS 64 may include circuitry to generate certain responses to the controller 20/28 because certain circuitry is eliminated in the RxPHY 66. For example, circuitry for Rx detect and idle pattern recovery may be needed if expected by the controller. K28.5 detection for framing may be customized to the new framing pattern.

In addition to the above-described simplifications, some embodiments of the system of FIG. 1 may eliminate AC capacitors on the interconnect 12 that would normally be included on a standard-compliant interface.

Figure 5:
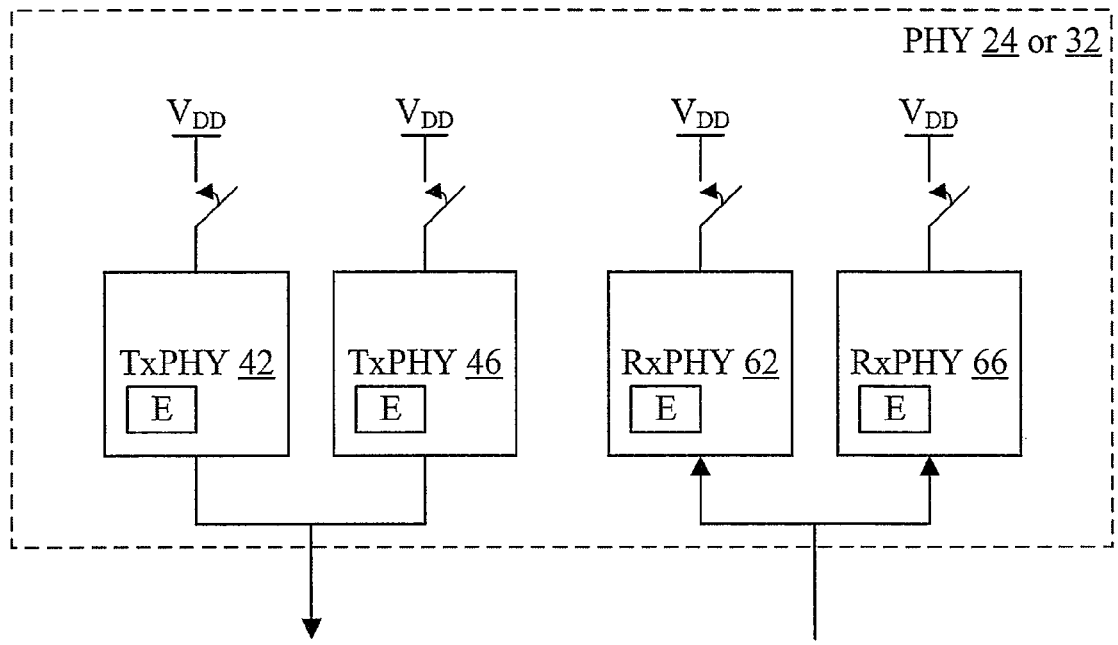
FIG. 5 is block diagram illustrating an embodiment in which standard PCIe PHY and simplified PHY are both included.

While some embodiments may replace the TxPHY 42 with the TxPHY 46 and the RxPHY 62 with the RxPHY 66, other embodiments may implement both PHYs on a chip. Such embodiments may be used in environments in which the interconnect is short and well managed, as well as more general environments. FIG. 5 is a block diagram of one such embodiment. The TxPHY 42 and the TxPHY 46 may be coupled in parallel between the pins and the PCS circuits (not shown in FIG. 5). Similarly, the RxPHY 62 and the RxPHY 66 are coupled in parallel.

Various embodiments may be used to select which PHY 42 or 46 and 62 or 66 is used. For example, in some embodiments, the connections of the PHYs may be made selectively in the metal layers of the SOC 10 or peripheral 14. That is, metal may optionally be connected to either the PHYs 42 and 62 or the PHYs 46 and 66. Accordingly, during manufacture, the support of the simplified PHYs or the standard PHYs is selected. Other embodiments may connect both sets of PHYs in parallel but may enable one of the PHYs 42 or 46 and 62 or 66. For example, each PHY in FIG. 5 is shown as included an enable register (E), which may be written to enable or disable a given PHY. Other embodiments may control the enable in registers separate from the PHYs, or may use pin strapping or other mechanisms for the enable. In some embodiments, the power supply may be switched to the PHYs in FIG. 5 (e.g. the switches illustrated in FIG. 3 between the PHYs and the power supply ($V_{DD}$). By powering down the disabled (non-selected) PHYs, power may be saved by reducing leakage currents.

Figure 4:
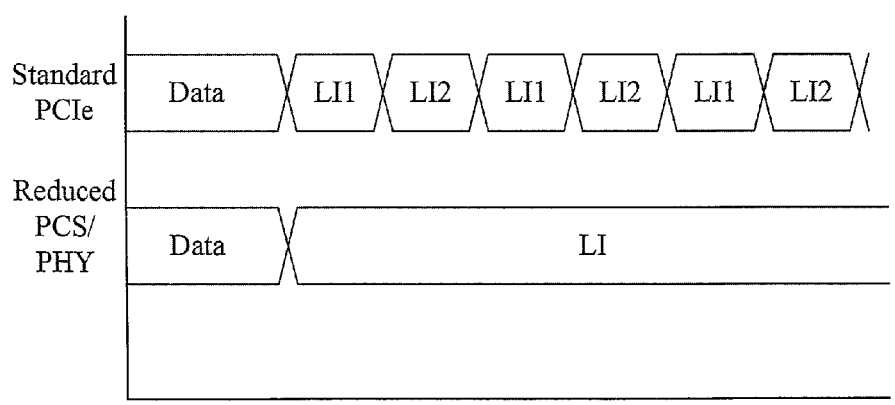
FIG. 4 is a timing diagram illustrating logical idle transmission according to one embodiment.

FIG. 4 is a timing diagram illustrating an additional optimization that may be implemented in one embodiment of the TxPCS 44/TxPHY 46 and RxPCS64/RxPHY 66 for logical idle transmissions. Logical idle is transmitted on the link when there is no data to transmit. In standard PCIe, two logical idle symbols are transmitted alternately (LI1 and LI2 in FIG. 4). The alternating symbols cause transitions, consuming power. The reduced PCS/PHY interface may use one symbol (LI in FIG. 4). The lack of transitions (i.e. a non-toggling idle symbol) reduces the power consumed. In some cases, the PCIe link traffic may be somewhat asymmetrical. For example, during writes from the SOC 10 to the peripheral component 14, the channel from SOC 10 to the peripheral component 14 may carry command and data whereas the channel from the peripheral component 14 to the SOC 10 may carry only acknowledge packets. Significant logical idle transitions may occur on the peripheral component 14 to SOC 10 channel. Using a single logical idle symbol with low transition density, or no transitions, may significantly reduce power consumption during such times. In another example, wireless traffic may have more downstream traffic than upstream traffic. For read commands that transfer a large amount of data (e.g. flash memory reads), the command channel may experience lower bandwidth. The lower bandwidth link may be transmitting logical idles for a significant period of time.

In one embodiment, the logical idle may be 00 in hexadecimal (i.e. all zeros). To meet DC balance requirements on a standard PCIe link, the above 8 bit all zero pattern may be converted to one of two logical idol symbols in the 10 bit word (L11 and L12). For example, the patterns may be 0110001011 (binary) and 1001110100 (binary). The pattern selected may depend on whether the running DC disparity is positive or negative. Power is consumed in this coding in several areas: (i) in coding the 10b words (and later decoding the words); (ii) sending additional bits (20% more in 8b/10b coding, less in 128b/130b coding); and (iii) converting a non-transitioning pattern into a transitioning pattern.

With a DC coupled, unterminated link, transition requirements to maintain DC balance may be eliminated. Accordingly, the all-zero logical idle symbol may be sent directly, eliminating transition power consumption. Furthermore, if the receiving buffer is modulo-2 (e.g. an 8 bit cyclical FIFO) and a strobe is used on the link, only the first logical idle symbol may be strobed. After that, the logical idles may be unstrobed and the previous value of zero may be read from the receive buffer until the next strobe occurs. The lack of strobes may further conserve power on the link.

Figure 6:
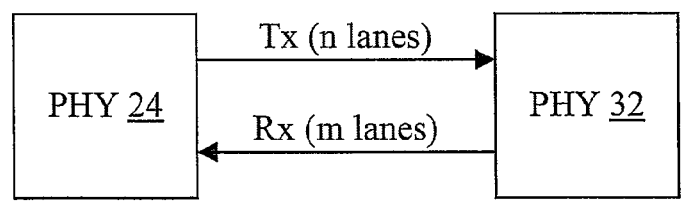
FIG. 6 is a block diagram illustrated an embodiment in which Tx and Rx lanes are unbalanced.

In an embodiment, the asymmetrical link traffic may be handled by unbalancing the transmit and receive links (in addition to the logical idle discussion above, or as an alternative). For example, FIG. 6 shown the PHYs 324 and 32, with n Tx lanes (from the PHY 24's point of view) and m Rx lanes, where n and m are integers and are not equal. For example, if the Tx bandwidth is expected to be greater than the Rx bandwidth, then n may be greater than m. If the Rx bandwidth is expected to be greater than the Tx bandwidth, then m may be greater than n. For bandwidths that are about equal, n and m may be equal. In some embodiments, only the channels actually used by the SOC 10 and the peripheral 14 may be implemented. Other channels may be virtualized, and the traffic/control of these channels may be emulated by the PCS/PHY layers to interact with a standard PCIe controller.

FIG. 7 is a table listing various modifications/optimizations that may be made in various embodiments of the PHYs. Any combination of the modifications/optimizations in the table may be implemented, and may be implemented with other modifications/optimizations discussed herein.

As mentioned above, the Rx detection may not be needed in an embedded system because the Rx device is known to be present. Accordingly, the Rx detect circuitry may be removed and the PHY or PCS may transmit an Rx detected signal to the controller. Electrical idle detection may also be simplified or eliminated in favor of implementing the same in the logic layer. ESD protection need not be as robust, since the SOC 10 and the peripheral 14 may be fixed components that are installed during assembly (in an ESD-controlled environment) and not changed. Accordingly, smaller ESD devices may be used than in standard PHYs (which may reduce capacitive loading and area consumed). As mentioned above, the receiver and transmitter signaling may be simplified, and clock/data recover may be eliminated in favor of using a forwarded clock or strobe.

In an embodiment, the simplified PHYs 46 and 66 may also support low latency, entry and exit to/from low power mode on the link. Typical PCIe PHY consumes tens of microseconds to exit the L1.2 mode, for example. A reference clock is started, then a phase lock loop (PLL) is locked, then common mode is established on the link lines, and other criteria are met to go to the L0 (active) state. On the other hand, the single-ended, unterminated PHY with strobes for clocking is close to light sleep mode with low power consumption. The simplified PHY may be lower speed, permitting a less complex PLL to be used which may be lower power and may have shorter lock times as well. The low power exit mode may be shorter as well since there is no common to establish, etc.

Numerous variations and modifications will become apparent to those skilled in the art once the above disclosure is fully appreciated. It is intended that the following claims be interpreted to embrace all such variations and modifications.

What is claimed is:

1. An integrated circuit having a peripheral interconnect to communicate with a peripheral device according to an industry standard specification, the integrated circuit comprising:
    a controller circuit configured to provide a media access control layer interface to the peripheral interconnect that complies with the industry standard specification; and
    a physical interface layer circuit coupled to the controller circuit, wherein the physical interface layer circuit is configured to:
        drive and receive signals on the peripheral interconnect; and
        drive an idle symbol on the signals when the peripheral interface is idle using a single non-toggling idle symbol in place of at least two alternating idle symbols specified by the industry standard specification.

2. The integrated circuit as recited in claim 1 wherein the physical interface layer circuit implements single-ended signaling for the signals on the peripheral interconnect.

3. The integrated circuit as recited in claim 2 wherein the single-ended signaling includes a clock to which the signals are referenced.

4. The integrated circuit as recited in claim 2 wherein the single-ended signaling includes a strobe to which the signals are referenced.

5. The integrated circuit as recited in claim 1 further comprising a second physical interface layer circuit that implements a physical layer compliant with the industry standard specification, wherein a first one of the physical interface layer circuit and the second physical interface layer circuit is designated to operate during use.

6. The integrated circuit as recited in claim 5 wherein a second one of the physical interface layer circuit and the second interface layer circuit is not designated to operate, and wherein the second one is powered off during use.

7. The integrated circuit as recited in claim 5 wherein the physical layer interface circuit and the second physical layer interface circuit include enables which are programmed to designate the first one during use.

8. The integrated circuit as recited in claim 5 wherein the first one is determined during manufacture of the integrated circuit.

9. The integrated circuit as recited in claim 8 wherein the first one is determined via metallization during manufacture.

10. The integrated circuit as recited in claim 5 wherein the physical interface layer circuit occupies a first amount of area and the second physical interface layer circuit occupies a second amount of area, wherein the second amount is greater than the first amount.

11. The integrated circuit as recited in claim 1 wherein a transmit side of the peripheral interconnect includes a first number of lanes and a receive side of the interconnect includes a second number of lanes, and wherein the first and second number differ.

12. The integrated circuit as recited in claim 11 wherein the first and second number are determined based on different bandwidth requirements for transmit and receive.

13. The integrated circuit as recited in claim 1 further comprising a physical coding sublayer (PCS) circuit implementing 8 bit/9 bit (8b/9b) coding.

14. The integrated circuit as recited in claim 1 further comprising a physical coding sublayer (PCS) circuit implementing 128 bit/130 bit (128b/130b) coding.

15. The integrated circuit as recited in claim 1 further comprising a physical coding sublayer (PCS) that excludes coding of the symbols.

16. The integrated circuit as recited in claim 1 wherein the industry standard specification specifies a first operating voltage for the peripheral interconnect, and wherein the integrated circuit employs a second operating voltage for the peripheral interconnect that is lower than the first operating voltage.

17. A system comprising:
- an integrated circuit having a peripheral interconnect according to an industry standard specification at a media access controller layer; and
- a peripheral device coupled to the peripheral interconnect, wherein the peripheral device is direct-current (DC) coupled to the integrated circuit over the peripheral interconnect, whereby capacitors specified by the industry standard specification are eliminated;
- wherein the integrated circuit comprises:
  - a controller circuit configured to provide a media access control layer interface to the peripheral interconnect that complies with the industry standard specification; and
  - a physical interface layer circuit coupled to the controller circuit, wherein the physical interface layer circuit is configured to:
    - drive and receive signals on the peripheral interconnect; and
    - drive an idle symbol on the signals when the peripheral interface is idle using a single non-toggling idle symbol in place of at least two alternating idle symbols specified by the industry standard specification.

18. The system as recited in claim 17 wherein each receiver on the peripheral interconnect is unterminated.

19. The system as recited in claim 17 wherein the peripheral interconnect includes a first number of lanes transmitting from the integrated circuit to the peripheral device and a second number of lanes transmitting from the peripheral device to the integrated circuit, wherein the first number is greater than the second number.

20. A peripheral device configured to communicate on a peripheral interconnect according to an industry standard specification, the peripheral device comprising:
- peripheral circuitry;
- a controller circuit coupled to the peripheral circuitry and configured to provide a media access control layer interface to the peripheral interconnect that complies with the industry standard specification; and
- a physical interface layer circuit coupled to the controller circuit, wherein the physical interface layer circuit is configured to:
  - drive and receive signals on the peripheral interconnect; and
  - drive an idle symbol on the signals when the peripheral interface is idle using a single non-toggling idle symbol in place of at least two alternating idle symbols specified by the industry standard specification.

* * * * *